United States Patent [19]

Walker et al.

[11] Patent Number: 4,749,856

[45] Date of Patent: Jun. 7, 1988

[54] WAVELENGTH-INDEPENDENT POLYMER/OPTICAL SENSING APPARATUS AND METHOD

[75] Inventors: George E. Walker, Longmeadow, Mass.; William K. Fisher, New Britain, Conn.

[73] Assignee: Monsanto Company, St. Louis, Mo.

[21] Appl. No.: 868,628

[22] Filed: May 29, 1986

Related U.S. Application Data

[63] Continuation-in-part of Ser. No. 739,973, May 31, 1985, abandoned, which is a continuation-in-part of Ser. No. 558,828, Dec. 7, 1983, abandoned.

[51] Int. Cl.$^4$ ............................................. H01J 5/16
[52] U.S. Cl. .................. 250/227; 250/231 R; 374/161
[58] Field of Search .................. 250/227, 231 R; 374/161, 162, 106

[56] References Cited

U.S. PATENT DOCUMENTS

| | | | |
|---|---|---|---|
| 3,002,385 | 10/1961 | Wahl et al. | 374/106 |
| 3,175,401 | 3/1965 | Geldmacher | 374/106 |
| 3,465,590 | 9/1969 | Kluth et al. | 374/162 |
| 3,878,722 | 4/1975 | Crites | 374/162 |
| 4,232,552 | 11/1980 | Hof et al. | 374/162 |
| 4,278,349 | 7/1981 | Sander | 374/162 |
| 4,307,607 | 12/1981 | Saaski et al. | 374/161 |

Primary Examiner—David C. Nelms
Attorney, Agent, or Firm—Fishman, Dionne & Cantor

[57] ABSTRACT

An optical sensing device which incorporates a suitable optical sensor system, preferably a fiber optics system, with a suitable environmental sensitive polymeric material is presented. The polymeric material must be of the type which undergoes wavelength-independent changes in optical properties in response to environmental changes. Accordingly, preferred polymers include crosslinked, semicrystalline polymers, high strength amorphous polymers, and polymer blends. This novel combination will accurately and, at times, reversibly measure and detect temperature, humidity, pressure, position, radiation, flow, stress/strain, light, color, electric field, and a plurality of other properties with respect to changes in the environment.

35 Claims, 9 Drawing Sheets

WAVELENGTH-INDEPENDENT POLYMER/OPTICAL SENSING APPARATUS AND METHOD

BACKGROUND OF THE INVENTION

This invention relates generally to an optical sensing method and device therefore. More particularly, this invention relates to a new and improved optical sensing method and device which incorporates a suitable optical sensor system, preferably a fiber optic system with an environmental sensitive polymeric material which undergoes changes in optical properties in response to environmental changes. This novel polymeric/optical sensor combination will accurately and at times reversibly measure and detect temperature, humidity, pressure, position, radiation, flow, strain/stress, light, color, electric field, and a plurality of other properties with respect to changes in the environment.

Optical sensors and particularly fiber optical sensing devices have found increasing use and acceptance. Recently, fiber optics technology has undergone phenomenal growth in various facets of industry, medicine, and communications. In fact, new applications for fiber optics are emerging daily for a variety of reasons. For example, unlike conventional wire transmission devices, light transmitting fiber optic systems employing glass, plastic or similar fibers are immune to radio frequency interference and electromagnetic interference. They are inert to hazardous or extreme environments and are not affected by temperatures from cryogenic levels to several hundred degrees Centigrade. Also, difficult to reach and normally inaccessible areas are easily penetrated by the small size and flexibility of fiber optic systems.

As a result, fiber optics are finding great success in the process control and automation areas. Since the fibers do not conduct electricity, they are immune to electrical interference, require no expensive shielded cable and provide very high accuracy. This high accuracy translates into improved reliability over mechanical and/or electronic sensors.

As already discussed, fiber optic systems have shown great promise in the fields of sensors and detectors for sensing a multitude of environmental and other properties. While some of these properties can be detected with known and conventional fiber optical devices, certain environmental phenomena require combining fiber optics with other secondary materials or devices. Accordingly, U.S. Pat. No. 4,215,285 describes a device for measuring a plurality of environmental properties which combines fiber optic techniques with a variety of phosphor compounds. For example, when measuring temperature, the object or environment to be measured is provided with a layer of phosphor material that when excited to luminescence emits detectable radiation within two or more distinct wavelength ranges that are optically isolatable from one another. The relative intensity of the emission in these wavelength ranges will vary in a known manner as a function of the temperature of the phosphor. The complexity of detecting these distinct wavelengths creates certain drawbacks in the phosphor detector devices. Accordingly, the complexity results in very high manufacture costs which severely limits the practical use of the fiber optics/phosphor system.

Similarly, other types of sensing devices which have combined both an optical system and other secondary materials or devices have been utilized such as bimetallic strips where the reflected light will be a function of the movement of the strip with temperature, piston movement resulting from gas or liquid expansion in an enclosed chamber, and flexible diaphragm movement for pressure measurements. Unfortunately, all are plagued with a variety of problems. Chief among these problems is a complexity of design and manufacture which results in high labor costs as well as greater chance for component malfunction.

Obviously, a material which can be combined with a fiber optics system and which can observe, monitor and detect environmental (i.e., temperature, humidity, pressure, etc.) changes during continual operations with accurate reproducibility would be highly advantageous. One well known class of materials which is capable of changing its optical properties as a function of temperature, humidity, etc., is organic polymeric materials, especially semicrystalline, crosslinked, high strength amorphous polymers, and such polymers with additives. For example, during heating and cooling, semicrystalline polymers undergo a well-known predictable and repeatable transformation of optical properties. Similarly, when exposed to solvent materials, polymers often undergo crazing which also affects the optical properties of the polymer. Surprisingly, despite these desirable and peculiar characteristics of polymers, the use of polymeric materials as a sensing medium in a fiber optic light transmitting assembly has heretofore not been practiced in the prior art.

Accordingly, it is a principle object of the present invention to provide a sensing medium to be used in conjunction with a suitable optical sensor system which overcomes the deficiencies of the prior art.

It is another object of the present invention to provide an organic environmental sensitive polymeric material, which undergoes changes in optical properties in response to environmental changes, in combination with a fiber optic light transmitting assembly to sense and/or detect changes in certain environmental properties.

It is still another object of the present invention to provide a semicrystalline and crosslinked polymeric material, which undergoes a transition in light or wave energy transmission at its melting point for use in indicating temperature change in optical sensors, preferably fiber optical sensors.

It is still another object of the present invention to combine a suitable environmental sensitive polymeric material with an optical sensor, preferably a fiber optical sensor to measure and detect changes in the relative humidity of the surrounding environment.

It is yet another object of the present invention to combine a suitable polymeric material in combination with an optical sensor, preferably a fiber optical sensor, to measure and detect changes in a multitude of environmental properties including, but not limited to, pressure, stress/strain, solubility, radiation, direction, position, flow, sound, acceleration, light, color and electrical field.

DESCRIPTION OF THE DRAWINGS

These and other objects will become more apparent from the following detailed description taken in connection with the accompanying drawings wherein.

DESCRIPTION OF THE PREFERRED EMBODIMENT

In accordance with the present invention, a novel sensing device capable of detecting plural environmental properties is essentially comprised of a suitable organic environmental sensitive polymer material, which can be either a semicrystalline or an amorphous polymer, with or without additives, combined with a suitable optical sensor means, preferably a fiber optic sensor means. Significantly, the polymeric material is one which is capable of undergoing a wavelength-independent change in optical properties in response to a change in the environment. The utilization of an environmental sensitive polymeric material capable of undergoing a wavelength - independent change in optical properties in response to a change in the environment provides a predictable and sometimes reversible change in optical properties which can be easily adapted to monitoring by conventional fiber optic sensors.

It is well known to those skilled in the art that polymers undergo predictable and sometimes reversible changes in opacity in relation to or as a consequence of a number of environmental conditions. This well known phenomenon is peculiar to polymers and polymer blends and, in fact, is one of the reasons that such materials have gained such a prevalent role in domestic and commercial applications. The present invention utilizes this knowledge by combining a suitable environmental sensitive polymer material with a fiber optics system. Thus, the changes in opacity of polymeric materials may be easily detected by optical sensors such as fiber optics to provide a heretofore unknown but extremely useful and needed hybrid sensor or monitor which is the essence of the present invention.

As mentioned, the polymer/optical sensor of the present invention may be utilized for measuring a variety of environmental properties. A critical requirement of the polymer used in the present invention is that it undergoes optical transformation within the electromagnetic wavelengths associated with ultraviolet, visible and infra red light. Thus, an optical sensor system in accordance with this invention will function within a light wavelength range of from about 100 to about 13,000 angstroms. The following detailed discussion of the manner in which particular environmental properties are detected will include some, but not all of the many properties to which the present invention is applicable. It will be understood to those skilled in the art that the present invention encompasses the measurement of any environmental property which utilizes the novel and synergistic combination of those polymeric materials capable of undergoing a wavelength - independent change in optical properties in response to a change in the environment and an optical sensor such as a fiber optic sensor.

TEMPERATURE

Figure 1:
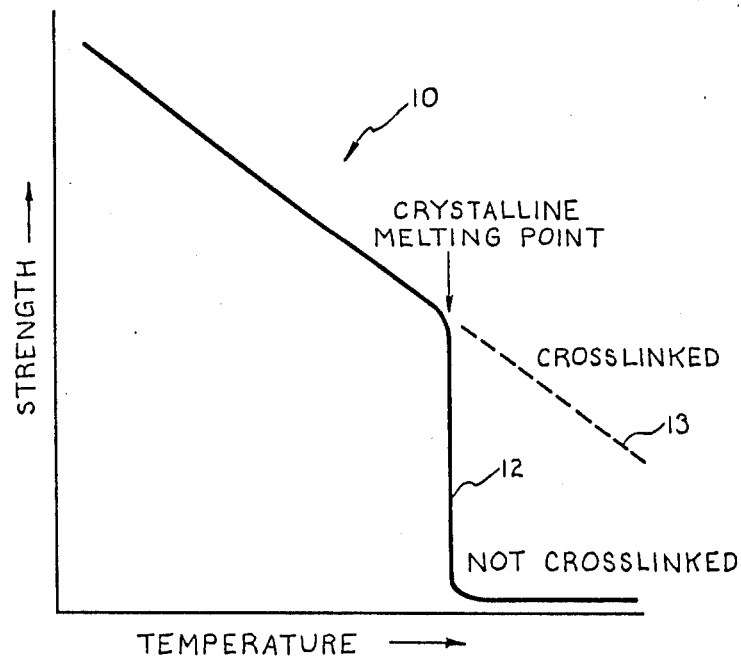
FIG. 1 is a curve of strength versus temperature for a typical semicrystalline polymer.

The optical/polymeric sensor of the present invention is particularly well suited for use as a temperature sensor. Referring to FIG. 1, a graph of strength versus temperature for a typical crosslinked semicrystalline polymer is shown at 10. It is well known that as the temperature rises, a polymer of this type will consistently pass through a "melting temperature (Tm)" at its crystalline melting point. In this transition temperature range, a change in opacity will result in a change in the wave energy transmission (i.e., the polymer will go from opaque to clear as the temperature rises). By tailoring specific polymers and polymer blends, the specific Tm may be altered to almost any desired temperature. Another type of optical/polymeric sensor which shows a stepped change in light output over a given temperature range comprises a polymer blend or mixture which will exhibit a wide range of cloud points due to the miscibility of the components (see discussion below relating to polymer/polymer solutions). This miscibility changes with temperature and will consequently indicate temperature increases and decreases. Also, the solubilization of an additive in a polymer matrix will yield different levels of light or wave energy transmission as a function of temperature. Accordingly, additives that change opacity in response to environmental changes can be blended with polymers, and such systems are considered as being a part of the environmental sensitive polymeric materials of the present invention. For example, a conventional paraffin wax, cerol or oil in amounts of up to 80% by weight have been found to be compatible with a polymer matrix such as ethylene vinyl acetate for reversible temperature sensing.

Crosslinking is very important as far as reproducibility, predictability and reversibility of the sensor system. Crosslinking provides a stable form which prevents the polymer from, for example, migration or flow during repeated melt cycles. It is possible or probable that most non-crosslinked polymers would not offer these novel reversible characteristics as these non-crosslinked materials are more likely to flow out of the light path of the fiber optics. The flow characteristics of uncrosslinked polymers are clearly shown by reference numerals 12 and 13 in FIG. 1 wherein the non-crosslinked polymer 12 has low strength and can undergo molecular flow and deformation. Conversely, the crosslinked polymer 13 retains a stable form even at high temperatures.

Figure 2:
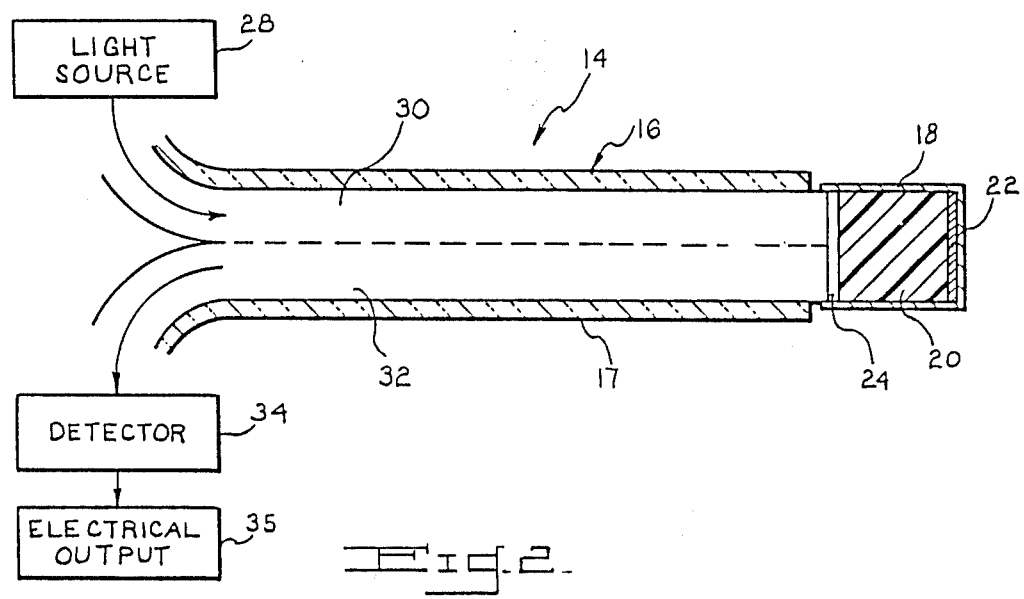
FIG. 2 schematically illustrates in general one embodiment of the polymeric/optical sensor of the present invention.

In FIG. 2, a view of one embodiment of a polymeric/optical sensor or fuse of the present invention suitable for temperature measurement is diagrammatically shown. The fuse 14 typically consists of fiber optic sensor means which includes a bifurcated fiber optic probe 16 of conventional construction enclosed in a protective sheath 17 which is inserted into a housing or sleeve 18. The housing 18 contains a semicrystalline polymer 20 and a reflective surface 22. The housing 18 will generally be in contact with the specimen whose temperature is to be measured. The reflective surface 22, polymer 20 and fiber optic probe 16 are all separated by gap 24. The gap 24 will act to compensate for expansion of the polymer during heating. The fiber optic sensor means further includes an infra red (IR) light source 28 and a detector means 34. Light from the light source 28 is fed through the transmitting bundle 30 of fibers to the polymeric material 20 and is passed therethrough to the reflecting surface 22. Reflected light then passes back through the polymer 20, subsequently emerging therefrom and is then passed through a receiving bundle 32 of fibers and into detector means 34 wherein the light energy is converted into an electrical output 35.

Figure 3:
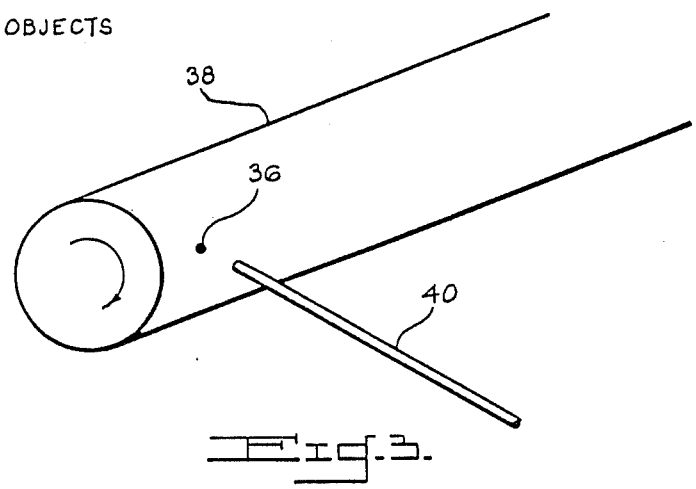
FIG. 3 schematically illustrates a polymeric/optical sensor for rotating objects in accordance with the present invention.
Figure 4:
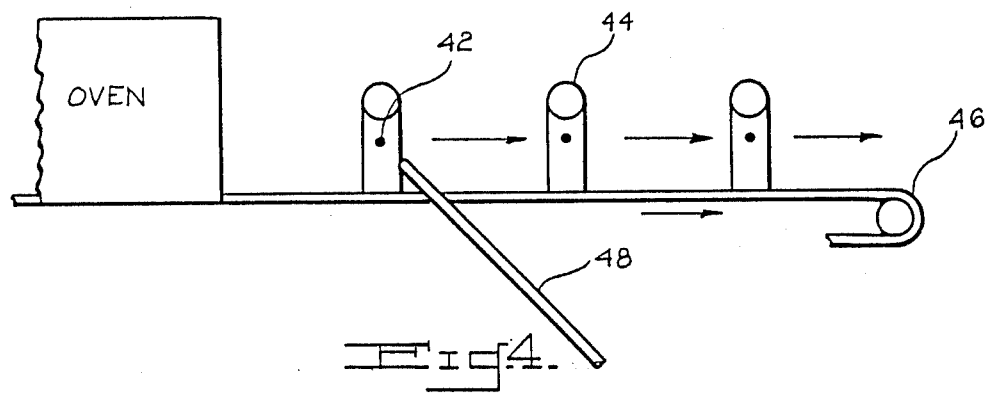
FIG. 4 schematically illustrates a polymeric/optical sensor for moving objects in accordance with the present invention.
Figure 5:
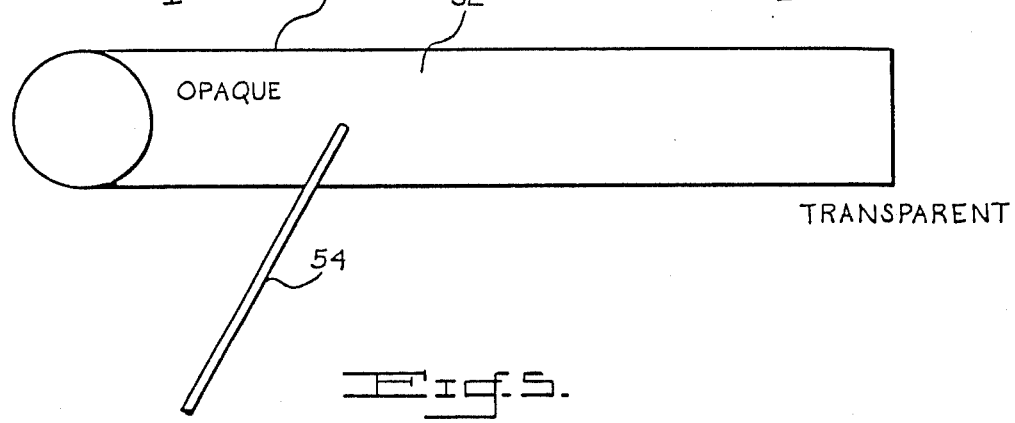
FIG. 5 schematically illustrates polymeric/optical sensor for large areas in accordance with the present invention.

Non-contact temperature measurement can also be achieved using methods and devices as depicted in FIGS. 3–5. In FIG. 3, an appropriate temperature responsive polymeric material is applied as a coating or film 36 to a rotating object 38 (i.e., shaft, roll, etc.). Changes in temperature are then recorded in a similar manner as described above by the bifurcated fiber optic cable 40.

Similarly, moving objects, for example, objects undergoing heat treating along a belt, are also susceptible to temperature monitoring by the polymeric/optical sensor of the present invention. In FIG. 4, an appropriate temperature responsive coating or film 42 is applied to a moving object 44 situated on a moving belt 46 after undergoing heat treatment. A fiber optics cable 48 then registers temperature change as described heretofore.

Finally, in FIG. 5, a large area of an object 50 (i.e., pipe) has been coated with a temperature responsive polymeric film 52. As the surface temperature of the film rises from $T_1$ to $T_2$, the opacity of the polymer changes accordingly and is detected by the fiber optics sensor 54.

Presently, two general types of temperature detectors have shown excellent potential for industrial and other uses. The first general type comprises a temperature sensor or switch which will accurately detect a desired temperature at the melting temperature (Tm) or response temperature ($T_r$) of the particular polymer or polymer blend respectively. In effect, the fiber optics is used to "watch" the change in opacity of polymers at their individual melting points. Thus, as the temperature of the environment to be measured rises, the polymer undergoes a predictable and reversible transition in structure with a corresponding change in opacity. This change in opacity is monitored by the light source of the fiber optics, converted to an electrical output and then easily read by a human or automated operator. Many different polymeric materials have been tested to determine suitability for use in this embodiment of the present invention. Important factors in selecting a particular polymer include the temperature range of the melting phenomenon (i.e., slope of curve 10 in FIG. 1), degree of crosslinking, and degree of crystallinity. The following Example I is a typical test.

TEMPERATURE MEASUREMENT EXAMPLES

The experimental set-up was similar to that shown in FIG. 2. The housing or sleeve 18 was constructed of brass and had an inner diameter of 0.125–0.129 inch, a wall thickness of 0.010 inch and a length of about 0.480 inch. The housing was then attached to the 0.125 inch diameter fiber optics probe 16 via a friction fit. The polymer 20 consisted of a 0.030 inch thick sample of 100% polycaprolactone (a semi-crystalline polymer) which had been electron beam treated to 10 megarads to effect desired crosslinking. A 0.005 inch aluminum reflector sheet 22 was employed. Finally, the gap between the probe end and the polymer sample was about 0.025 inch. The probe end was inserted into a controlled heater block. Temperature was monitored by a thermometer and thermocouple which were also inserted in the heater block. An infrared light source (light-emitting diode) was fed through the transmitting bundle 30 of fibers to the polycaprolactone and was passed therethrough to the reflecting surface 22. Reflected light then passed back through the polymer and into a photo diode detector whereupon the light was converted to an electrical signal (voltage). A recorder simultaneously measured the voltage from the detector relative to the rising temperature from the thermocouple.

Figure 6:
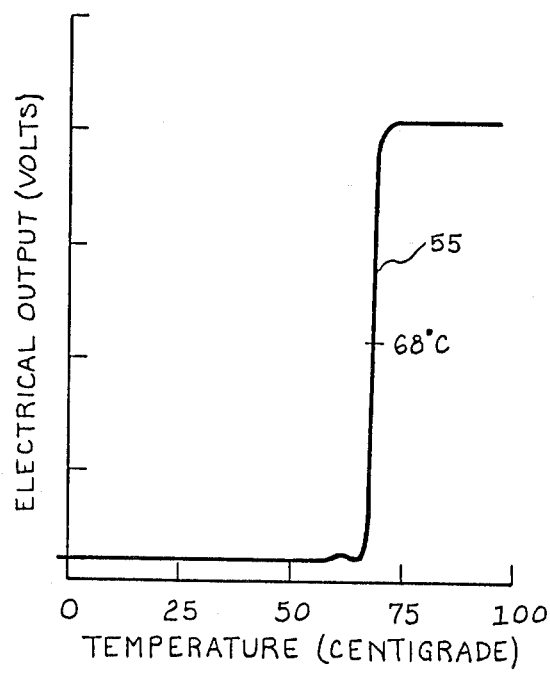
FIG. 6 is a curve of output versus temperature for a typical polycaprolactone derived in accordance with the present invention.

FIG. 6 shows the temperature response ($T_r$) curve for the 100% polycaprolactone sample, the average temperature response taken over a series of runs being about 68° C. FIG. 6 is a plot of electrical output in volts versus temperature. Note that the almost vertical slope of the curve 55 corresponds to the Tm of the sample (about 68° C.). The narrow temperature range and vertical slope exhibited by the polycaprolactone sample is indicative of a semicrystalline and crosslinked polymer capable of accurate temperature sensing. Without crosslinking, the sample flowed and was not usable. Typical curves have been determined for other polymers with the response at a "fuse" or response temperature ($T_r$) being recorded as illustrated in the polycaprolactone example. The $T_r$ for other polymers tested are as follows:

| Polymeric Material | Tr |
|---|---|
| Polypropylene | 163° C. |
| Poly 1.4 butylene adipate | 58° C. |
| Polyethylene oxide | 63.5° C. |
| Polyethylene adipate | 49° C. |

In the case of an environmental sensitive polymeric material which is a blend of 70 parts paraffin wax (55° C. melting point) and 30 parts ethylene vinyl acetate polymer, the $T_r$ was 56° C.

It has also been found that the use of cross-linked environmental sensitive polymers provides reproduceable response temperatures over a large number of cycles. For example, in cross-linked EVA/wax blends having wax freezing points ranging from about 97° F. to about 21° F., cycles of between 10,000 (10K) and 14,000 (14K) have been completed with no significant change in response temperatures as is shown in the table set forth below:

| Wax Freezing Point (°F.) | $T_R$ (°F.) | CYCLES |
|---|---|---|
| 97 | 105 | 10K |
| 112 | 120 | 10K |
| 134 | 135 | 10K |
| 139 | 150 | 14K |
| 148 | 165 | 11K |
| 178 | 185 | 11K |
| 210 | 225 | 11K |

Figure 10A:
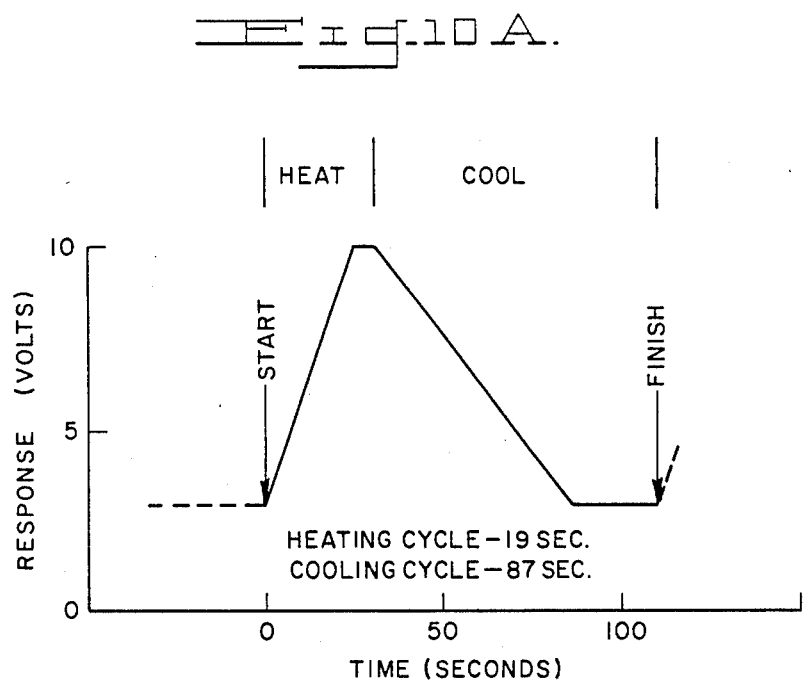
FIG. 10A graphically illustrates a single heating/cooling cycle for an EVA/wax blind.
Figure 10B:
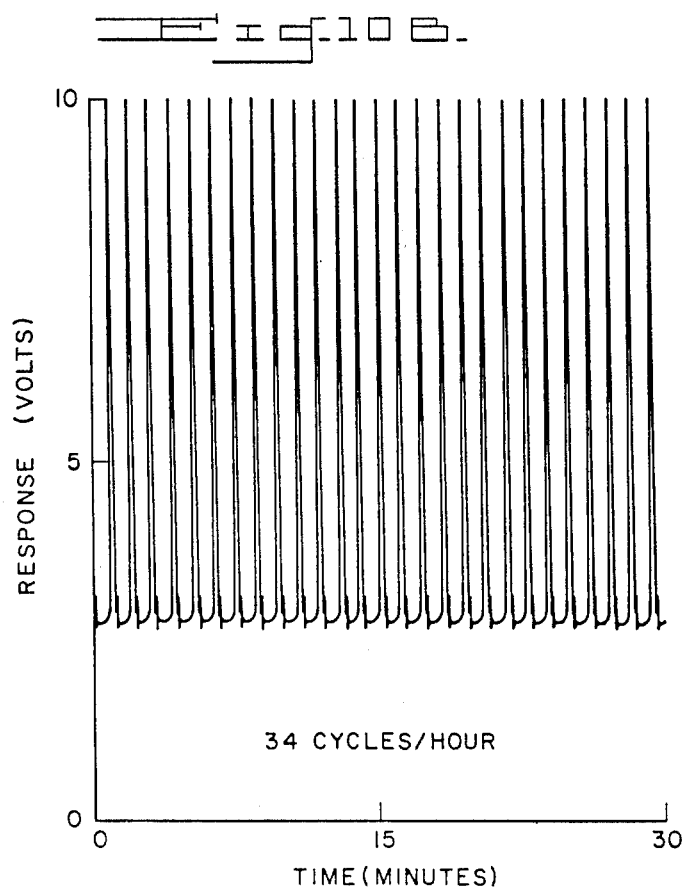
FIG. 10B graphically illustrates multiple heating/cooling cycles for the material of FIG. 10A.

Cycling tests were conducted utilizing an apparatus comprising a focused infrared heater which heated a polymeric sensor as described herein and which was connected via fiber optics to a detector and recorder. Ambient air cooling was utilized between heating cycles. Referring to FIGS. 10A and 10B, using an EVA/wax blend having a $T_r$ of about 135° F., a heating and cooling cycle is shown graphically in a time vs volts plot in FIG. 10A; while cycling data for 34 cycles/hour is shown in FIG. 10B.

The polymer/optical sensor of the present invention is also well adapted for utilizing the cloud points of polymer/polymer solutions as optical temperature switches. Below the cloud point temperature, these sensors are clear, fully miscible solid solutions. At the cloud point temperature, the polymeric components phase separate with the result that the sensor becomes opaque. Thus as the sensor is heated through the cloud point, the light output goes from high to low. Most cloud point phenomenon in polymer/polymer solutions are not reversible and if they are, the components go back into solution very slowly.

Figure 11:
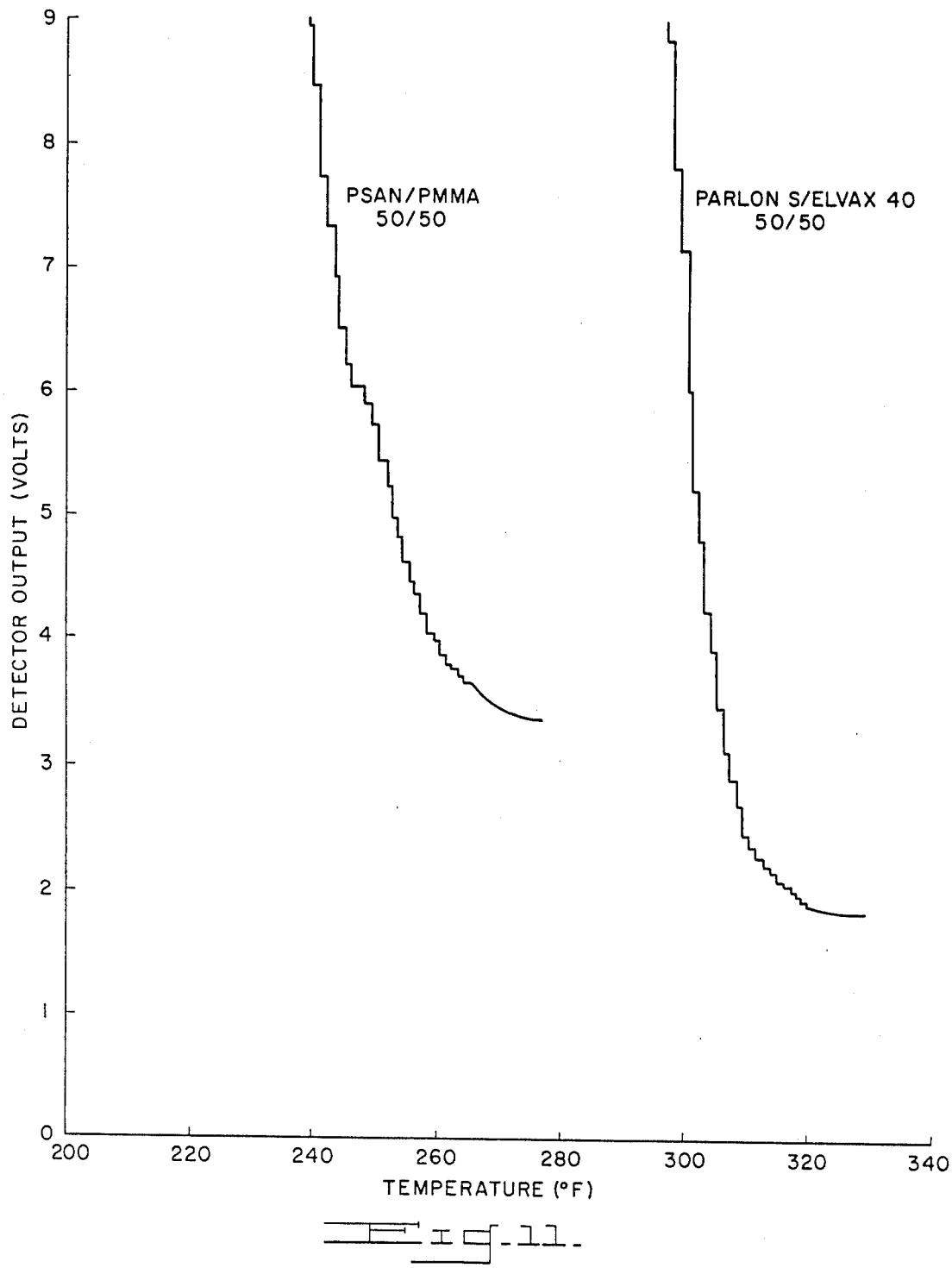
FIG. 11 graphically illustrates optical sensing curves for polymer/polymer-solutions.

The cloud point temperature depends upon the nature of the solution components and on their composition. The data in FIG. 11 illustrates the change in light output at the cloud point for two different polymer/polymer solutions. One is a 50%/50% blend of styrene-acrylonitrile copolymer (PSAN) with poly(methyl methacrylate) (PMMA) and the other is a 50%/50% blend of chlorinated rubber (Parlon S) with an ethylene vinyl acetate copolymer (Elvax 40). Both of these sensor systems are useful as irreversible optical temperature switches.

Figure 7:
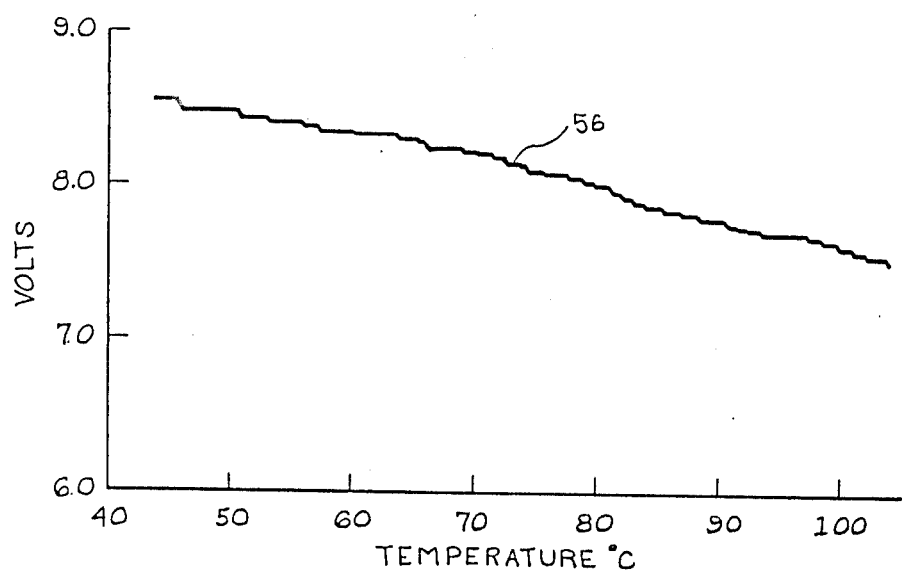
FIG. 7 is an analog temperature response of a modified polyvinylchloride derived in accordance with the present invention.

A second general type of temperature detection as opposed to the just discussed "switch" or "fuse" type is the analog response of light transmission versus temperature which has been discovered in, for example, rubber modified polyvinyl chloride (PVC) systems. A typical analog temperature response is shown in FIG. 7 and is a graph of light transmission converted into an electrical response (voltage) versus temperature in degrees centigrade for a rubber modified PVC. It has been theorized that the opacity of the rubber modified PVC blend increases as a result of the correspondingly increasing difference in refractive indices of the two components. In other words, the refractive index changes at a faster rate for the rubber since it is above its Tg. While the refractive index also changes for the PVC, this change is at a slower rate since it is a glassy (below Tg) polymer. The increasing difference in refractive index with increasing temperature results in increased opacity of the polymer sensor and therefore decreased light output as shown in FIG. 7.

Additional examples of analog temperature sensors are shown in the Table below for two other polymeric materials. This data from the examples below was obtained using the same experimental set-up as used for the optical thermostat work (FIG. 2).

| ANALOG TEMPERATURE SENSORS | | | |
|---|---|---|---|
| Sample | mV Slope °F. | Temp. Range | (°F.) |
| Rubber Reinforced PVC (See FIG. 6) | −20.0 | 110 | 210 |
| ABS (acrylonitrile-butadiene styrene) | −1.8 | 78 | 196 |
| Rubber Reinforced Poly (methyl methacrylate) | −1.7 | 200 | 310 |

Humidity

The polymer/optical sensor of the present invention is also well suited for use in monitoring humidity. Water absorption levels are extremely high (up to 80% percent) for some polymers (i.e., carboxymethyl cellulose). This absorbed water is known to change the light transmission properties of the polymer/water systems. Similarly, it is known that hydroscopic salts or additives in polymers will increase the water uptake and cause changes in light transmission. The water absorption levels are directly related to relative humidity of the surrounding environment.

Figure 8:
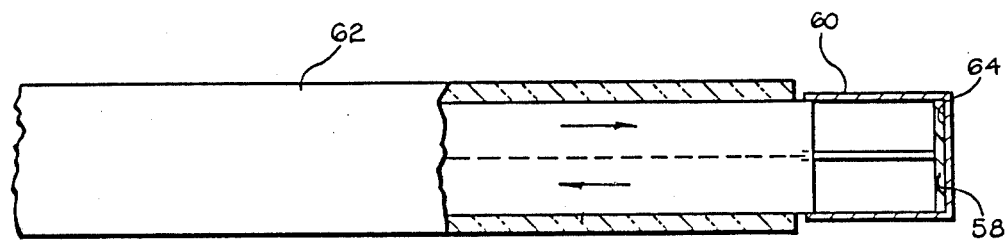
FIG. 8 schematically illustrates a polymeric/optical sensor for humidity in accordance with the present invention.
Figure 8A:
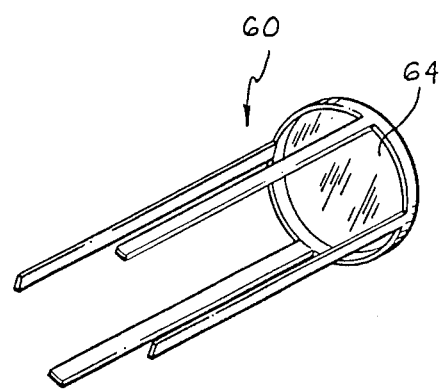
FIG. 8A is a partially enlarged view of a section of FIG. 8.
Figure 9:
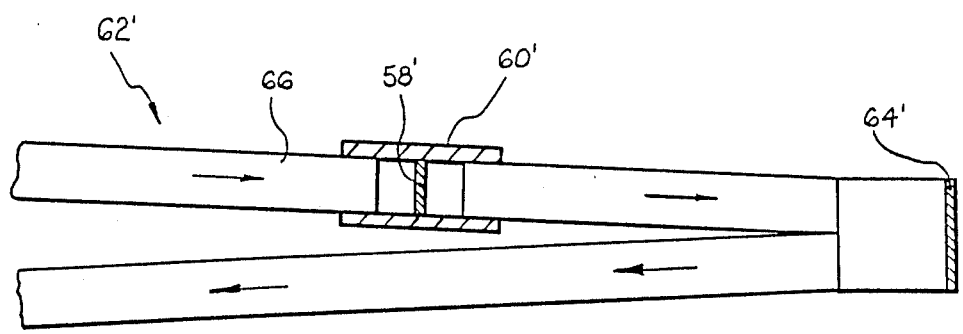
FIG. 9 schematically illustrates another embodiment of a polymeric/optical sensor for temperature in accordance with the present invention.

Humidity measurements may be accomplished by a method and apparatus as shown in FIGS. 8 and 8A, wherein a plastic sensor 58 is formed as a thin film or molded part which is capable of achieving rapid equilibrium water levels. Referring to FIG. 8, the housing 60 should preferably be a case-like holder as shown in FIG. 8A which would easily permit the free passage of moisture laden air to reach the polymer sensor 58. As with the temperature sensor, a bifurcated fiber optics sensor 62 is attached to the housing 60. Thus, as the light travels from an IR source (not shown), it is passed through the polymer sensor of sample 58, reflected off of reflector 64 and passed back through the fiber optics to be eventually converted into electric impulses and analyzed. While one particular apparatus for measuring humidity in a polymer/optical sensor has been described in FIGS. 8 and 8A, obviously any other suitable apparatus may be used.

HUMIDITY MEASUREMENT EXAMPLES

Figure 12:
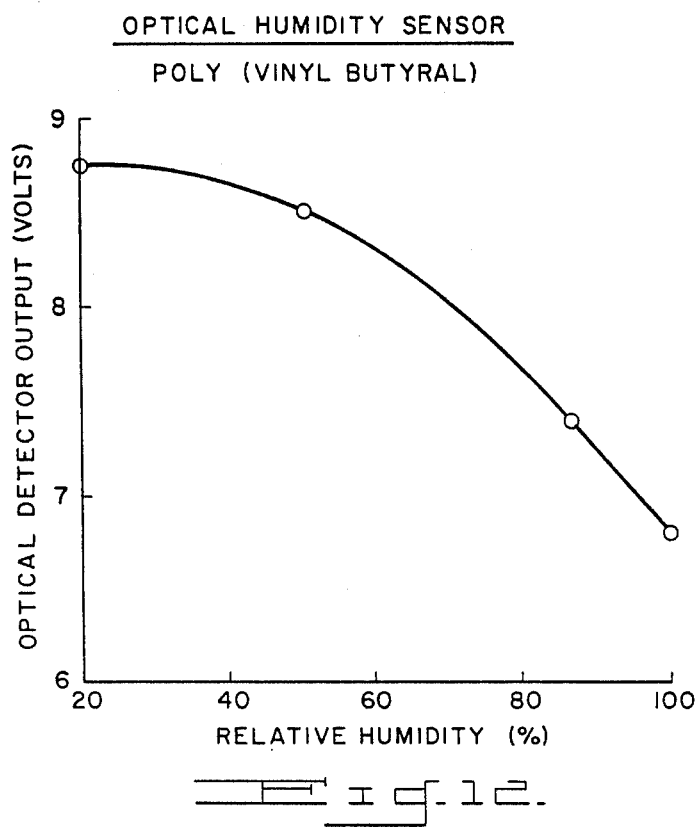
FIG. 12 graphically illustrates an optical humidity sensor curve.

The sensor element consisted of a 17 mil thick poly (vinyl butyral) disk mounted in a stainless steel housing. Two small holes were drilled in the housing so that the sensor could interact with the surrounding environment. This sensor system was placed on the end of bifurcated fiber optic probe such as is shown in FIG. 8. Results indicate a reversible increase in opacity (decrease in sensor output signal) with increasing relative humidity. Typical results from one set of tests are are graphically shown in FIG. 12. The decreased signal arises from haze formation caused by moisture absorption in the poly (vinyl butyral) matrix.

Stress/Strain and Pressure

Polymers are known to exhibit birefringence patterns when stressed. A fiber optic cable with a secondary environmental sensitive device comprised of a suitable polymer is contemplated wherein polarized light is used as the light source. Thus, a stress or pressure change will provide a changed birefringence pattern and result in an appropriate electrical signal.

Figure 13:
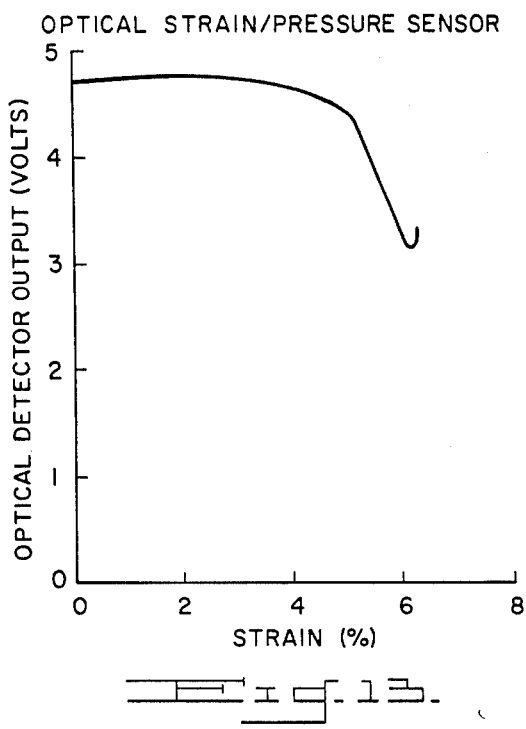
FIG. 13 graphically illustrates an optical sensing curve of strain/pressure sensing.

Optical pressure/stress/strain sensors may also be based on stress whitening of multiphase polymeric systems. Samples of rubber reinforced PMMA were stressed on an Instron tensile testing machine. Sample opacity vs. strain was measured in conjunction with stress vs. stain. The rubber reinforced PMMA showed a sudden increase in opacity (whitening) at a strain of about 13% which corresponds to the yield point on the stress vs. strain curve. In FIG. 13, a strain (5) vs optical detector output (volts) for acrylonitrile-butadiene-styrene (ABS). The ABS exhibited whitening at about a 5% degree of strain.

Figure 14:
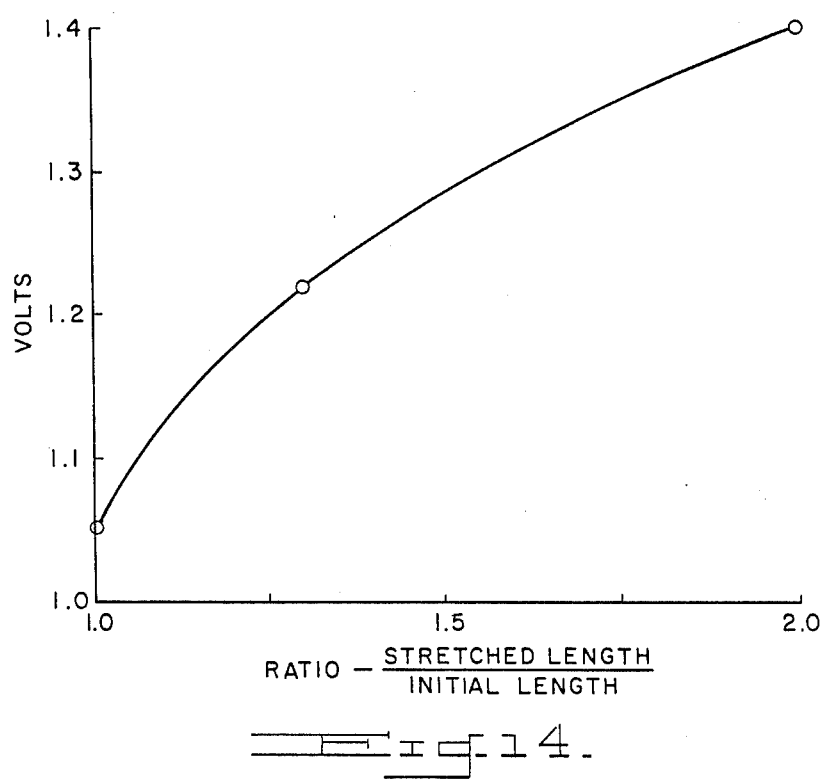
FIG. 14 graphically illustrates an optical sensing curve of stress/strain data for a rubber with high elasticity.

In another experiment, natural rubber sample with high elasticity (high elasticity being defined as complete recovery after being stretched to at least four (4) times the original length) was stretched or elongated to 1.3 and 2 times its original length. Optical readings as output voltages were recorded and are presented in FIG. 14 and in the Table below.

| Stretched Length Original length | Output volts |
|---|---|
| 1.0 | 1.05 |
| 1.3 | 1.24 |
| 2.0 | 1.40 |
| 1.0 | 1.08 |

Dimensions
t = .050"
width = 0.250"
Total length = 2.0"

Solvents

It is also well known that certain polymers will craze when they are attacked by solvents. This crazing causes significantly reduced light transmission due to light scattering. In an experiment, an injection molded amorphous polystyrene sensor (0.100 inch thickness) was positioned below a bifurcated fiber optics probe provided with a reflective backing to give a reading of 0.46 (full scale voltage output of 1.0). Acetone was subsequently applied to the polymer sample wherein the light transmission was decreased to 0. The housing surrounding the polymer sample should probably be similar to the housing 60 used in the humidity sensor. These solvent sensors as heretofore described would find excellent utility in detecting spills, leaks, gas concentrations, etc.

Figure 15:
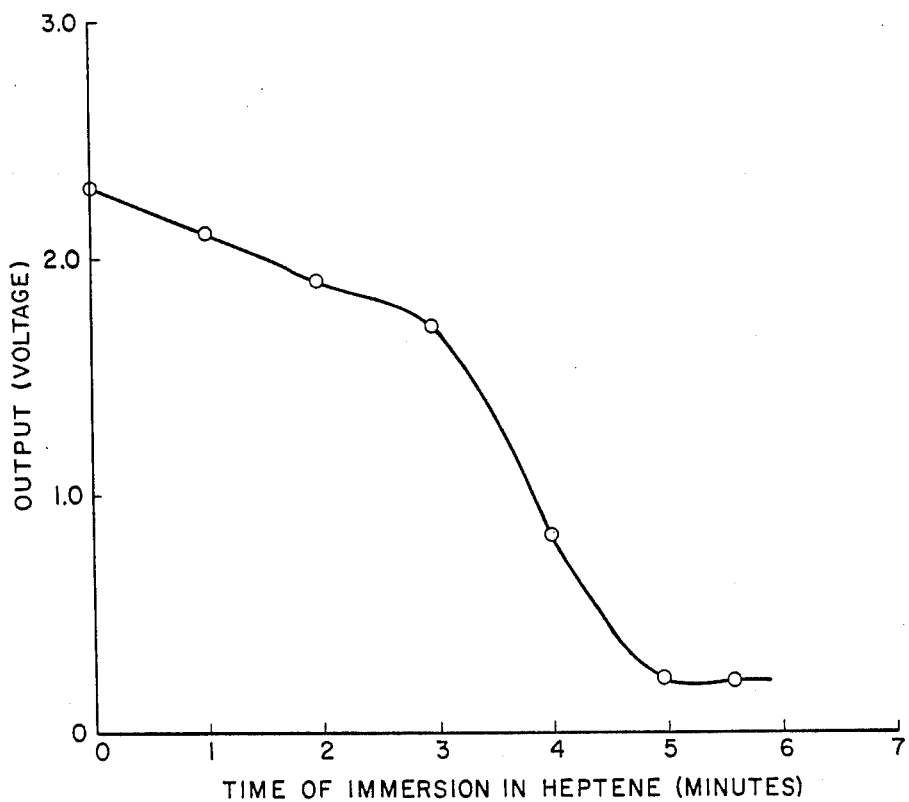
FIG. 15 graphically illustrates an optical sensing curve for a polymeric material undergoing solvent swelling.

While it is well known that polymers will craze when attacked by solvents, many polymers also undergo solvent swelling. It has been found that optical polymeric sensors in accordance with the present invention may utilize this solvent swelling characteristic. For example, lightly crosslinked poly tertiary butylstyrene having a thickness of 0.065" and a diameter of 0.125" was placed in a test cap similar to the caps used for humidity. A reflective aluminum cover film was placed on top of the sample, i.e., the light source side. The sensor was then immersed in heptane. The polymer was swollen by the heptane and increased in size thus changing the distance between the aluminum cover film and the light source. The change in distance will provide a change in light output. The recorded data are set forth below and in FIG. 15.

| Time after exposure (minutes) | Optical output as volts |
|---|---|
| 0 | 2.3 |
| 1 | 2.1 |
| 2 | 1.9 |
| 3 | 1.7 |
| 4 | 0.8 |
| 5 | 0.2 |
| 5.3 | 0.2 |

Radiation

Similarly, dosimeters or sensors for solar radiation and ionizing radiation may also be constructed from a polymer/optical combination, since it is well known that certain polymers degrade when exposed to radiation. This degradation may be a surface change or a bulk polymer color change. Both types of degradation will give an identifiable change in light transmission in a fiber optic sensor system.

Finally, the polymer/optical sensor of the present invention is well suited for detecting any number of other environmental properties including, but not limited to, direction, position, flow, sound, acceleration, light, color and electric field.

It will be understood that while the present invention has the novel advantage which has heretofore not been found in the prior art of reversibly detecting temperature and humidity, some environmental properties will not be repeatable without providing a new polymer sample. For example, radiation (sunlight) and crazing from solvents will irreversibly degrade the polymer.

Figure 16:
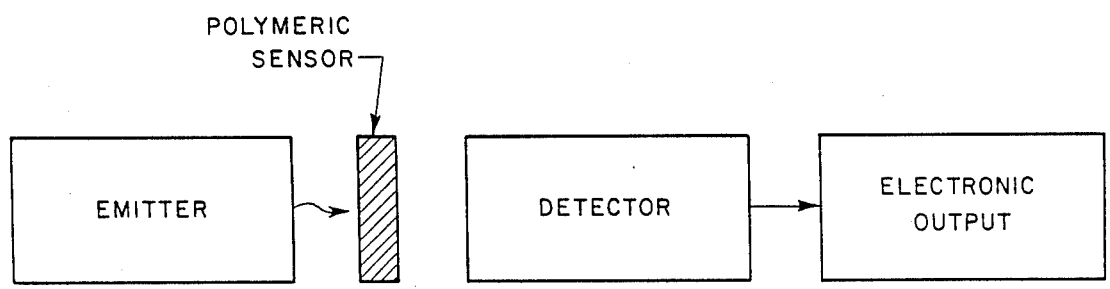
FIG. 16 schematically illustrates another embodiment of a polymeric/optical sensor in accordance with the present invention.

It should also be understood that while the present invention has been described in terms of using a fiber optics system as the optical sensing apparatus, other suitable optical devices would work equally as well including, but not limited to, lasers, sunlight, and other light sources combined with visual, light sensitive film and the like as detectors. For example, an LED (light emitting diode) and light detector used in a fiber optics data link have been shown to be an acceptable optical sensing system used in conjunction with the polymeric sensors of the present invention. No fibers were used to convey the signal for the sensed environment to the source or detector. Referring to FIG. 16, a light emitter and a light detector were aligned optically with a 0.600" air gap separating the two items. The light source provided wave energy at 660 nm (visible red). The polymeric sensor material was 70 parts paraffin wax (mp. 45° C.) and 30 parts of ethylene vinyl acetate polymer with a $T_R$ of 49° C. The sensor material of thickness 0.026" was placed in the gap and readings taken below and above the response temperature.

| | Output Volts | |
|---|---|---|
| | Below $T_R$ | Above $T_R$ |
| | 3.61 | 3.12 |
| repeat | 3.61 | 3.12 |

Note that this system provides high voltages at low transmission and reduced voltages at high transmission or reverse output logic compared to the fiber optic based apparatus described in FIG. 2.

In view of the above discussion, it is clear that polymer/optical sensors which are capable of undergoing wavelength-independent changes in opacity or optical properties in response to environmental changes in combination with a conventional fiber optics device are aptly suited for handling a multitude of monitoring and sensing operations.

An important feature and advantage of the present invention is that the environmental sensitive polymeric material must be capable of undergoing a wavelength—independent change in optical properties in response to a change in the environment. Then "wavelength—independence" property of the polymeric sensor material is particularly significant.

Because of the wavelength independence of the present invention, the source/detector spectral characteristics are not critical as long as the spectral sensitivity of the detector approximately matches the light source emission characteristics. This relaxation of the restriction to monochromatic light, so important in the practice of many prior art devices, results in the instant invention providing considerable simplification. Low cost, broad wavelength band source/detector pairs are readily available. There is no need for any extra light bandpass filters. Also, sensor systems using wavelength independent optical phenomenon are not sensitive to drift in source/detector spectral characteristics. Those prior art devices which are "wavelength dependent" typically sense changes in color; not changes in U.S. Pat. Nos. 4,278,344 and 4,232,552. Neither of these two patents disclose a polymeric optical sensor utilizing wavelength—independent phenomena as in the present invention.

While preferred embodiments have been shown and described, various modification and substitutions may be made thereto without departing from the spirit and scope of the invention. Accordingly, it is to be understood that the present invention has been described by way of illustration and not limitation.

What is claimed is:

1. A device for detecting environmental changes comprising:
   fiber optical sensor means; and
   an environmental sensitive polymeric material capable of undergoing a wavelength-independent change in optical properties in response to a change in the environment, said environmental sensitive polymeric material communicating with said fiber optical sensor means and said environment whereby a change in the environment which causes said optical change in the said polymeric material is sensed and indicated by said fiber optic sensor means.

2. The device of claim 1 wherein:
   said environmental sensitive polymeric material undergoes reversible changes in optical properties in response to said change in the environment.

3. The device of claim 1 wherein:
   said environmental sensitive polymeric material is a semicrystalline polymeric material.

4. The device of claim 1 wherein:
   said environmental sensitive polymeric material is a crosslinked polymeric material.

5. The device of claim 1 wherein:
   said environmental sensitive polymeric material is an amorphous polymeric material.

6. The device of claim 1 wherein:
   said environmental sensitive polymeric material is a blend of an organic polymer and an additive which is a member of the group consisting of a wax, a cerol and an oil.

7. The device of claim 1 wherein:
   said environmental sensitive polymeric material is a solution of at least two polymeric materials.

8. The device of claim 7 wherein:
   said solution of polymeric materials is a solution selected from the group consisting of styrene-acrylonitrile copolymer (PSAN) with polymethyl/methacrylate (PMMA) and chlorinated rubber with ethylene vinyl acetale copolymer.

9. The device of claim 1 wherein:
   said environmental sensitive polymeric material is a polymeric material selected from the group consisting of polycaprolactone, polypropylene, poly 1.4 butylene adipate, polyethylene oxide, polyethylene adipate, rubber modified polyvinylchloride and a wax extended ethylene vinyl acetate, acrylonitrile-butadiene-styrene (ABS), polymethyl/methacrylate (PMMA), rubber reinforced PMMA, natural rubber, poly tertiary butlystryrene and polyvinylbutyral.

10. The device of claim 1 wherein said fiber optic sensor means includes:
   a fiber optic cable having at least one first light transmitting fiber and at least one second light transmitting fiber, said first and second fibers each having first and second ends;
   a housing for said environmental sensitive polymeric material and for receiving the ends of said first and second light transmitting fibers;
   light source means connected to said first light transmitting fiber; and
   light detecting means connected to said second light transmitting fiber, said environmental sensitive polymeric material being disposed in said housing so that the light from said light source means carried by said first light transmitting fiber passes through said environmental sensitive polymeric material to said second light transmitting fiber.

11. The device of claim 10 including:
   a gap between said first and second ends of said fibers and said environmental sensitive polymeric material.

12. The device of claim 11 including:
   converter means connected to said light detecting means whereby light from said light source is converted into electrical output.

13. The device of claim 10 wherein:
   said housing includes a reflector, said reflector and said first and second ends of said fibers being disposed on opposite sides of said environmental sensitive polymeric material whereby light from said first light transmitting fiber passes through said environmental sensitive polymeric material and is reflected back through said polymeric material to said second light transmitting fiber.

14. The device of claim 10 wherein:
   said housing includes a reflector, said reflector and said first and second ends of said fibers being disposed on the same side of said environmental sensitive polymeric material, said reflector being spaced a selected distance from said fiber ends.

15. The device for detecting environmental changes comprising:

optical sensor means; and an environmental sensitive polymeric material capable of undergoing a wave-length independent change in optical properties in response to a change in the environment, said environmental sensitive polymeric material communicating with said optical sensor means and said environment whereby a change in the environment which causes said optical change in the said polymeric material is sensed and indicated by said optical sensor means;

said optical sensor means including;

a housing for said environmental sensitive polymeric material, said housing including two opposing sides;

light emitting means spaced from one side of said housing; and light detecting means spaced from the other of said opposed sides of said housing wherein light from said light emitting means passes through said environmental sensitive polymeric material to said light detecting means.

16. The device of claim 15 wherein:
said light emitting means is a light emitting diode (LED).

17. The device of claim 15 including:
converter means connected to said light detecting means whereby light from said light source is converted into electrical output.

18. A method for detecting environmental changes using a fiber optic sensor means which communicates with an environmental sensitive polymeric material, said polymeric material being capable of undergoing a wavelength-independent change in optical properties in response to a change in the environment, including the steps of:

providing a change to the environment which causes an optical change in said environmental sensitive polymeric material;

sensing said optical change with said fiber optic sensor means; and indicating said sensed optical change with said fiber optic sensor means.

19. The method of claim 18 wherein:
the step of providing a change to the environment which causes an optical change in said environmental sensitive polymeric material comprises at least one of the environmental changes of temperature, humidity, pressure, stress, strain, radiation, solvent crazing, solvent swelling, direction, position, acceleration, and light.

20. The method of claim 18 wherein:
causing said environmental sensitive polymeric material to undergo reversible changes in optical properties in response to said change in the environment.

21. The method of claim 18 wherein:
said environmental sensitive polymeric material is a semicrystalline polymeric material.

22. The method of claim 18 wherein:
said environmental sensitive polymeric material is a crosslinked polymeric material.

23. The method of claim 18 wherein:
said environmental sensitive polymeric material is an amorphous polymeric material.

24. The method of claim 18 including the step of:
forming said environmental sensitive polymeric material as a blend of an organic polymer and an additive which is a member of the group consisting of a wax, a cerol and an oil.

25. The method of claim 18 wherein:
said environmental sensitive polymeric material is a solution of at least two polymeric materials.

26. The method of claim 25 wherein:
said solution of polymeric materials is a solution selected from the group consisting of styrene-acrylonitrile copolymer (PSAN) with polymethyl/methracrylate (PMMA) and chlorinated rubber with ethylene vinyl acetale copolymer.

27. The method of claim 18 wherein:
said environmental sensitive polymeric material is a polymeric material selected from the group consisting of polycaprolactone, polypropylene, poly 1.4 butylene adipate, polyethylene oxide, polyethylene adipate, rubber modified polyvinylchloride and a wax extended ethylene vinyl acetate acrylonitrile-butadiene-styrene (ABS), polymethyl/methacrylate (PMMA), rubber reinforced PMMA, natural rubber, poly tertiary butlystyrene and polyvinylbutyral.

28. The method of claim 18 wherein said fiber optic sensor means includes:

forming a fiber optic cable having at least one first light transmitting fiber and at least one second light transmitting fiber, said first and second fibers each having first and second ends;

forming a housing for said environmental sensitive polymeric material and for receiving said ends of said first and second light transmitting fibers;

connecting light source means to said first light transmitting fiber; and connecting light detecting means to said second light transmitting fiber, said environmental sensitive polymeric material being disposed in said housing so that the light from said light source means carried by said first light transmitting fiber passes through said environmental sensitive polymeric material to said second light transmitting fiber.

29. The method of claim 26 including the step of:
forming a gap between said first and second ends of said fibers and said environmental sensitive polymeric material.

30. The method of claim 29 including the step of:
connecting converter means to said light detecting means whereby light from said light source is converted into electrical output.

31. The method of claim 28 wherein including the step of:

providing a reflector to said housing, said reflector and said first and second ends of said fibers being disposed on opposite sides of said environmental sensitive polymeric material whereby light from said first light transmitting fiber passes through said environmental sensitive polymeric material and is reflected back through said polymeric material to said second light transmitting fiber.

32. The method of claim 28 wherein:
said housing includes a reflector, said reflector and said first and second ends of said fibers being disposed on the same side of said environmental sensitive polymeric material with said reflector being spaced a selected distance from said fiber ends.

33. A method for detecting environmental changes using an optical sensor means which communicates with an environmental senitive polymeric material, said polymeric material being capable of undergoing a wavelength-independent change in optical properties in response to a change in the environment, including the steps of:

provided a change to the environment which causes an optical change in said environmental sensitive polymeric material;

sensing said optical change with said optical sensor means, said optical sensor means including a housing for said environmental sensitive polymeric material, said housing including two opposing sides, light emitting means spaced from one side of said housing, and light detecting means spaced from the other of said opposed sides of said housing wherein light from said light emitting means passes through said environmental sensitive polymeric material to said light detecting means; and indicating said sensed optical change with said optical sensor means.

34. The method of claim 33 including the step of:
providing said light emitting means as a light emitting diode (LED).

35. The method of claim 33 including:
connecting converter means to said light detecting means whereby light from said light source is converted into electrical output.

* * * * *